(12) United States Patent  (10) Patent No.: US 7,644,254 B2
Darrington et al.  (45) Date of Patent: Jan. 5, 2010

(54) ROUTING DATA PACKETS WITH HINT BIT FOR EACH SIX ORTHOGONAL DIRECTIONS IN THREE DIMENSIONAL TORUS COMPUTER SYSTEM SET TO AVOID NODES IN PROBLEM LIST

(75) Inventors: David L. Darrington, Rochester, MN (US); Patrick Joseph McCarthy, Rochester, MN (US); Amanda Peters, Rochester, MN (US); Albert Sidelnik, St. Paul, MN (US); Brian Edward Smith, Rochester, MN (US); Brent Allen Swartz, Chippewa Falls, WI (US)

(73) Assignee: International Business Machines Corporation, Armonk, NY (US)

( * ) Notice: Subject to any disclaimer, the term of this patent is extended or adjusted under 35 U.S.C. 154(b) by 181 days.

(21) Appl. No.: 11/736,811

(22) Filed: Apr. 18, 2007

(65) Prior Publication Data

US 2008/0263386 A1  Oct. 23, 2008

(51) Int. Cl.
*G06F 15/173* (2006.01)
(52) U.S. Cl. .......................... 712/10; 709/230
(58) Field of Classification Search .................. None
See application file for complete search history.

(56) References Cited

U.S. PATENT DOCUMENTS

| | | | |
|---|---|---|---|
| 5,287,345 A * | 2/1994 | Osmon et al. ................... 700/2 |
| 5,495,426 A * | 2/1996 | Waclawsky et al. ......... 709/226 |
| 6,865,149 B1 * | 3/2005 | Kalman et al. .............. 370/225 |
| 2006/0034171 A1 * | 2/2006 | Rajsic et al. ................ 370/235 |
| 2007/0053283 A1 * | 3/2007 | Bidwell et al. .............. 370/216 |
| 2008/0084827 A1 | 4/2008 | Archer et al. |
| 2008/0084864 A1 | 4/2008 | Archer et al. |
| 2008/0084865 A1 | 4/2008 | Archer et al. |
| 2008/0084889 A1 | 4/2008 | Archer et al. |
| 2008/0178177 A1 | 7/2008 | Archer et al. |
| 2008/0186853 A1 | 8/2008 | Archer et al. |
| 2008/0189573 A1 | 8/2008 | Darrington et al. |

* cited by examiner

*Primary Examiner*—Kenneth S Kim
(74) *Attorney, Agent, or Firm*—Bret J. Petersen; Martin & Associates, LLC (57) ABSTRACT

A method and apparatus for dynamically rerouting node processes on the compute nodes of a massively parallel computer system using hint bits to route around failed nodes or congested networks without restarting applications executing on the system. When a node has a failure or there are indications that it may fail, the application software on the system is suspended while the data on the failed node is moved to a backup node. The torus network traffic is routed around the failed node and traffic for the failed node is rerouted to the backup node. The application can then resume operation without restarting from the beginning.

10 Claims, 6 Drawing Sheets

ROUTING DATA PACKETS WITH HINT BIT FOR EACH SIX ORTHOGONAL DIRECTIONS IN THREE DIMENSIONAL TORUS COMPUTER SYSTEM SET TO AVOID NODES IN PROBLEM LIST

BACKGROUND OF THE INVENTION

1. Technical Field

This invention generally relates to fault recovery in a parallel computing system, and more specifically relates to an apparatus and method for dynamically rerouting node traffic on the compute nodes of a massively parallel computer system using hint bits without restarting applications executing on a massively parallel super computer.

2. Background Art

Efficient fault recovery is important to decrease down time and repair costs for sophisticated computer systems. On parallel computer systems with a large number of compute nodes, a failure of a single component may cause a large portion, or the entire computer to be taken off line for repair. Restarting an application may waste a considerable amount of processing time prior to the failure.

Massively parallel computer systems are one type of parallel computer system that have a large number of interconnected compute nodes. A family of such massively parallel computers is being developed by International Business Machines Corporation (IBM) under the name Blue Gene. The Blue Gene/L system is a scalable system in which the current maximum number of compute nodes is 65,536. The Blue Gene/L node consists of a single ASIC (application specific integrated circuit) with 2 CPUs and memory. The full computer is housed in 64 racks or cabinets with 32 node boards in each rack.

The Blue Gene/L supercomputer communicates over several communication networks. The 65,536 computational nodes are arranged into both a logical tree network and a 3-dimensional torus network. The logical tree network connects the computational nodes in a tree structure so that each node communicates with a parent and one or two children. The torus network logically connects the compute nodes in a three-dimensional lattice like structure that allows each compute node to communicate with its closest 6 neighbors in a section of the computer. Since the compute nodes are arranged in a torus and tree network that require communication with adjacent nodes, a hardware failure of a single node can bring a large portion of the system to a standstill until the faulty hardware can be repaired. For example, a single node failure could render inoperable a complete section of the torus network, where a section of the torus network in the Blue Gene/L system is a half a rack or 512 nodes. Further, all the hardware assigned to the partition of the failure may also need to be taken off line until the failure is corrected.

On large parallel computer systems in the prior art, a failure of a single node during execution often requires that the software application be restarted from the beginning or from a saved checkpoint. When a failure event occurs, it would be advantageous to be able to move the processing of a failed node to another node so that the application can resume on the backup hardware with minimal delay to increase the overall system efficiency. Without a way to more effectively recover from failed or failing nodes, parallel computer systems will continue to waste potential computer processing time that increases operating costs.

DISCLOSURE OF INVENTION

An apparatus and method is described for dynamically rerouting node traffic on the compute nodes of a massively parallel computer system using hint bits to route around failed nodes or congested networks without restarting applications executing on the system. When a node has a failure or there are indications that it may fail, the application software on the system is suspended while the data on the failed node is moved to a backup node. The torus network traffic is routed around the failed node and traffic for the failed node is rerouted to the backup node. Similarly, network traffic can be routed around a congested network.

The examples and disclosure are directed to the Blue Gene architecture but extend to any parallel computer system with multiple processors arranged in a network structure where the node hardware handles cut through traffic from other nodes.

The foregoing and other features and advantages will be apparent from the following more particular description, as illustrated in the accompanying drawings.

BRIEF DESCRIPTION OF DRAWINGS

The disclosure will be described in conjunction with the appended drawings, where like designations denote like elements, and.

BEST MODE FOR CARRYING OUT THE INVENTION

The disclosure and claims herein are directed to an apparatus and method for dynamically rerouting node traffic on the compute nodes of a massively parallel computer system using hint bits without restarting applications executing on the system. When a node has a failure or there are indications that it may fail, the application software on the system is suspended while the data on the failed node is moved to a backup node. The torus network traffic is routed around the failed node and traffic for the failed node is rerouted to the backup node. The examples will be described with respect to the Blue Gene/L massively parallel computer being developed by International Business Machines Corporation (IBM).

Figure 1:
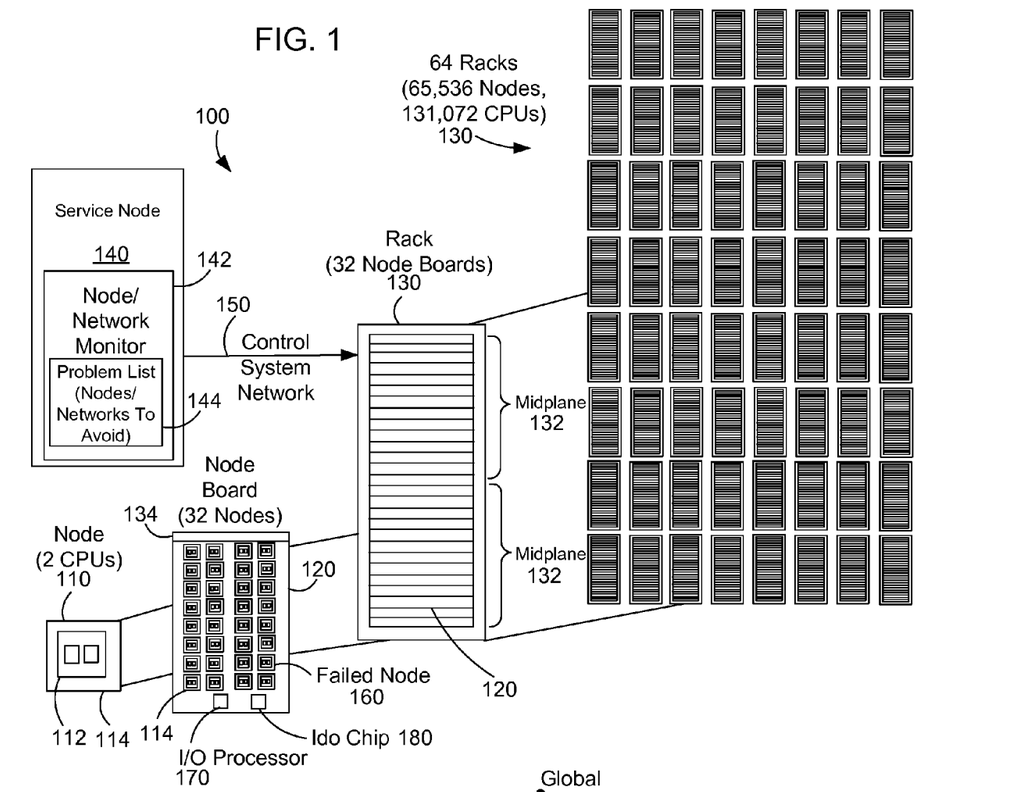
FIG. 1 is a block diagram of a massively parallel computer system.

FIG. 1 shows a block diagram that represents a massively parallel computer system 100 such as the Blue Gene/L computer system. The Blue Gene/L system is a scalable system in which the maximum number of compute nodes is 65,536. Each node 110 has an application specific integrated circuit (ASIC) 112, also called a Blue Gene/L compute chip 112. The compute chip incorporates two processors or central processor units (CPUs) and is mounted on a node daughter card 114. The node also typically has 512 megabytes of local memory (not shown). A node board 120 accommodates 32 node daughter cards 114 each having a node 110. Thus, each node board has 32 nodes, with 2 processors for each node, and the associated memory for each processor. A rack 130 is a housing that contains 32 node boards 120. Each of the node boards 120 connect into a midplane printed circuit board 132 with a midplane connector 134. The midplane 132 is inside the rack and not shown in FIG. 1. The full Blue Gene/L computer system would be housed in 64 racks 130 or cabinets with 32 node boards 120 in each. The full system would then have 65,536 nodes and 131,072 CPUs (64 racks×32 node boards× 32 nodes×2 CPUs).

The Blue Gene/L computer system structure can be described as a compute node core with an I/O node surface, where communication to 1024 compute nodes 110 is handled by each I/O node that has an I/O processor 170 connected to the service node 140. The I/O nodes have no local storage. The I/O nodes are connected to the compute nodes through the logical tree network and also have functional wide area network capabilities through a functional network (not shown). The functional network is connected to an I/O processor (or Blue Gene/L link chip) 170 located on a node board 120 that handles communication from the service node 160 to a number of nodes. The Blue Gene/L system has one or more I/O processors 170 on an I/O board (not shown) connected to the node board 120. The I/O processors can be configured to communicate with 8, 32 or 64 nodes. The connections to the I/O nodes are similar to the connections to the compute node except the I/O nodes are not connected to the torus network.

Again referring to FIG. 1, the computer system 100 includes a service node 140 that handles the loading of the nodes with software and controls the operation of the whole system. The service node 140 is typically a mini computer system such as an IBM pSeries server running Linux with a control console (not shown). The service node 140 is connected to the racks 130 of compute nodes 110 with a control system network 150. The control system network provides control, test, and bring-up infrastructure for the Blue Gene/L system. The control system network 150 includes various network interfaces that provide the necessary communication for the massively parallel computer system. The network interfaces are described further below.

The service node 140 manages the control system network 150 dedicated to system management. The control system network 150 includes a private 100-Mb/s Ethernet connected to an Ido chip 180 located on a node board 120 that handles communication from the service node 160 to a number of nodes. This network is sometime referred to as the JTAG network since it communicates using the JTAG protocol. All control, test, and bring-up of the compute nodes 110 on the node board 120 is governed through the JTAG port communicating with the service node. In addition, the service node 140 includes a node/network monitor 142 that maintains a problem list 144 that indicates nodes that have failed, may be failing, or network links to avoid. The node/network monitor comprises software in the service node 140 but may be assisted by operating system software executing on the nodes of the system.

Figure 2:
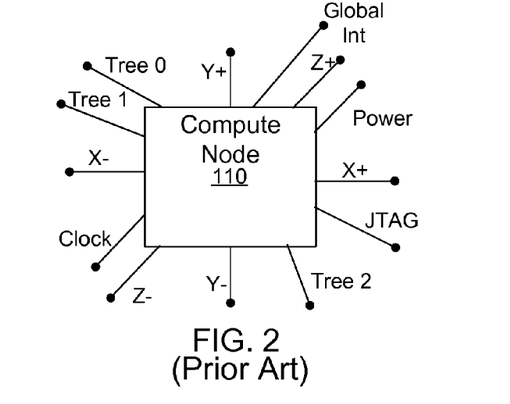
FIG. 2 is a block diagram that shows the input and output connections of a compute node in a massively parallel computer system.

The Blue Gene/L supercomputer communicates over several communication networks. FIG. 2 shows a block diagram that shows the I/O connections of a compute node on the Blue Gene/L computer system. The 65,536 computational nodes and 1024 I/O processors 170 are arranged into both a logical tree network and a logical 3-dimensional torus network. The torus network logically connects the compute nodes in a lattice like structure that allows each compute node 110 to communicate with its closest 6 neighbors. In FIG. 2, the torus network is illustrated by the X+, X−, Y+, Y−, Z+ and Z− network connections that connect the node to six respective adjacent nodes. The tree network is represented in FIG. 2 by the tree0, tree1 and tree2 connections. Other communication networks connected to the node include a JTAG network and a the global interrupt network. The JTAG network provides communication for testing and control from the service node 140 over the control system network 150 shown in FIG. 1. The global interrupt network is used to implement software barriers for synchronization of similar processes on the compute nodes to move to a different phase of processing upon completion of some task. The global interrupt network can thus be used to start, stop and pause an application running on a partition of nodes. Further, there are clock and power signals to each compute node 110.

The Blue Gene/L torus interconnect connects each node to its six nearest neighbors (X+, X−, Y+, Y−, Z+, Z−) in a logical 3D Cartesian array. The connections to the six neighbors is done at the node level, and at the midplane level. Each midplane is a 8×8×8 array of nodes. The six faces (X+, X−, Y+, Y−, Z+, Z−) of the node array in the midplane are each 8×8=64 nodes in size. Each torus network signal from the 64 nodes on each of the six faces is communicated through the link cards (not shown) connected to the midplane to the corresponding nodes in adjacent midplanes. The signals of each face may also be routed back to the inputs of the same midplane on the opposite face when the midplane is used in a partition with a depth of one midplane in any dimension.

Figure 3:
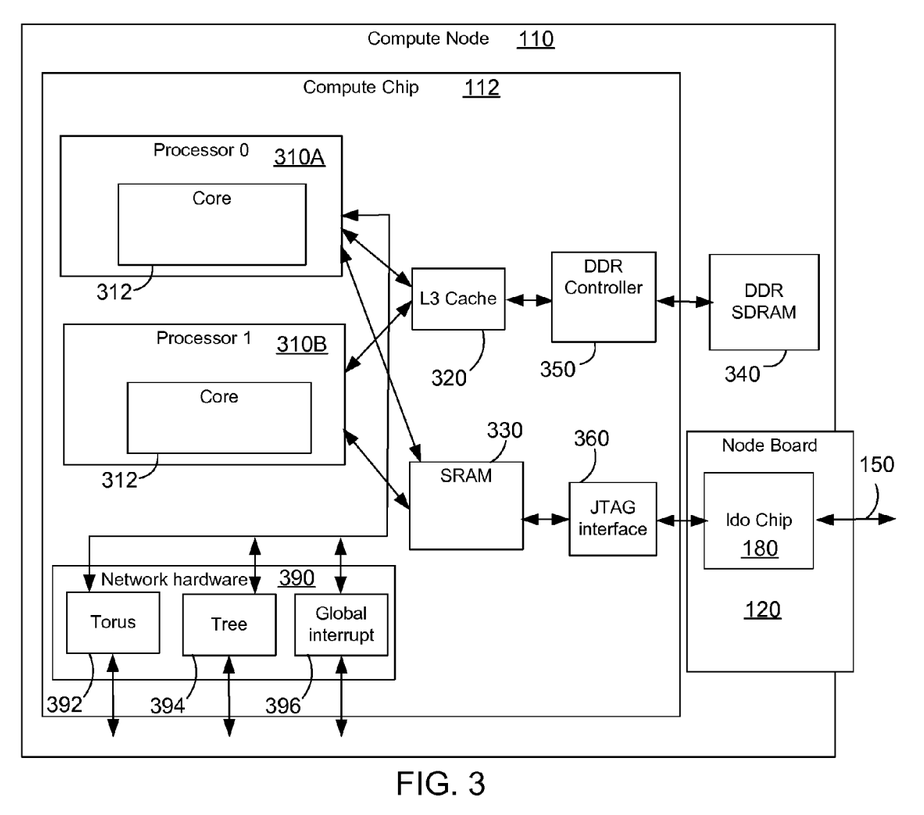
FIG. 3 is a block diagram of a compute node in a massively parallel computer system.

FIG. 3 illustrates a block diagram of a compute node 110 in the Blue Gene/L computer system according to the prior art. The compute node 110 has a node compute chip 112 that has two processors 310A, 310B. Each processor 310A, 310B, has a processing core 312. The processors are connected to a level three memory cache (L3 cache) 320, and to a static random access memory (SRAM) memory bank 330. Data from the L3 cache 320 is loaded to a bank of dual data rate (DDR) synchronous dynamic random access memory (SDRAM) 340 by means of a DDR memory controller 350.

Again referring to FIG. 3, the SRAM memory 330 is connected to a JTAG interface 360 that communicates off the compute chip 112 to an Ido chip 180. The service node communicates with the compute node through the Ido chip 180 over the an ethernet link that is part of the control system network 150 (described above with reference to FIG. 1). In the Blue Gene/L system there is one Ido chip per node board 120, and others on boards in each midplane 132 (FIG. 1). The Ido chips receive commands from the service node using raw UDP packets over a trusted private 100 Mbit/s Ethernet control network. The Ido chips support a variety of serial protocols for communication with the compute nodes. The JTAG protocol is used for reading and writing from the service node 140 (FIG. 1) to any address of the SRAMs 330 in the compute nodes 110 and is used for the system initialization and booting process.

The node compute chip 112, illustrated in FIG. 3, further includes network hardware 390. The network hardware 390 includes hardware for the Torus 392, Tree 394 and Global interrupt 396 networks. These networks of the Blue Gene/L are used for a compute node 110 to communicate with the other nodes in the system as described briefly above. The network hardware 390 allows the compute node to receive and pass along data packets over the torus network. The network hardware 390 handles network data traffic independently so the compute node's processors are not burdened by the amount of data flowing on the torus network. This network data that passes through the node destined for another node is called "cut-through" traffic.

Figure 4:
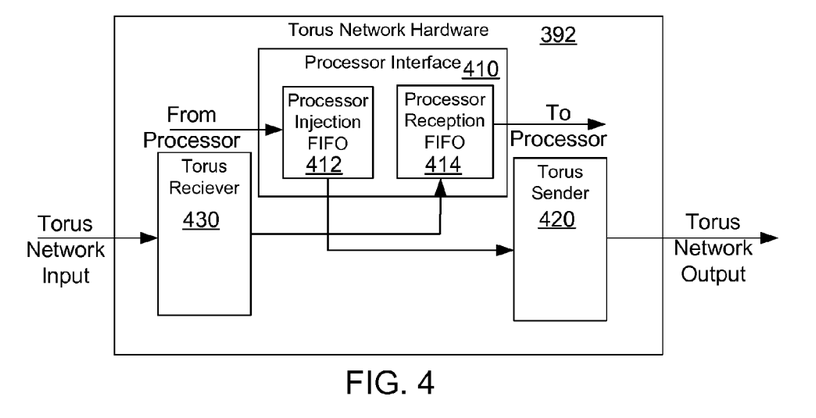
FIG. 4 is a block diagram of the torus network hardware of a compute node in a massively parallel computer system.

FIG. 4 illustrates a block diagram of the torus network hardware 392 introduced in FIG. 3. The torus network hardware 392 consists of three major units—a processor interface 410, a torus sender 420, and a torus receiver 430. The processor interface 410 consists of processor injection 412 and processor reception 414 FIFOs (queues in which access is according to the first in, first out rule). Access to these FIFOs is via double floating-point unit (FPU) registers (not shown) from the processors (310A, 310B in FIG. 3); i.e., data is loaded into the FIFOs via 128-bit memory-mapped stores from a pair of FPU registers, and data is read from the FIFOs via 128-bit loads to the FPU registers. There are a total of eight injection FIFOs organized into two groups: two high-priority (for internode operating system messages) and six normal-priority FIFOs, which are sufficient for nearest-neighbor connectivity. Packets in all FIFOs can go out in any direction on the torus network. In the processor reception FIFO 414, there are again two groups of FIFOs. Each group contains seven FIFOs, one high-priority and one dedicated to each of the six incoming directions. More specifically, there is a dedicated bus between each receiver and its corresponding reception FIFO. For storage, all torus FIFOs use static random access memory chips (SRAMs) protected by error checking and correction (ECC), and all internal data paths are checked for parity.

Figure 5:
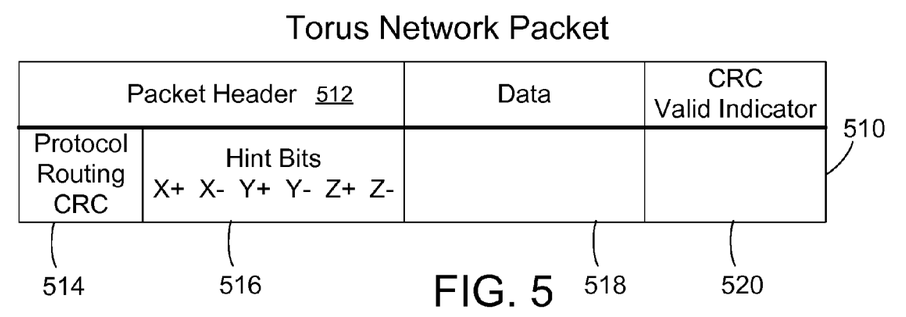
FIG. 5 is a block diagram of a torus network data packet in a massively parallel computer system.

The torus network hardware 392 described above directs variable-size packets of data across the various torus networks. FIG. 5 illustrates an example of a torus network packet 510. Each packet 510 in the BlueGene/L system is n×32 bytes, where n=1 to 8 "chunks." Messages, such as those conforming to the Message Passing Interface Standard (MPI), may consist of many packets that are constructed, sent, and received by software running on one or both associated BlueGene/L processors 310A, 310B in FIG. 3. The first eight bytes of each packet is a packet header 512. The packet header 512 contains link-level protocol information (e.g., sequence number); routing information, including destination; virtual channel and size; and a byte-wide cyclic redundancy check (CRC) that detects header data corruption during transmission 514. The packet header 512 also includes hint bits 516 that are described further below.

Again referring to FIG. 5, a number of data bytes 518 is included after the packet header 512. In addition, a 24-bit CRC is appended to each packet, along with a one-byte valid indicator 520. The valid indicator is necessary, since packets can begin being forwarded before being entirely received. This CRC permits checking of each packet as it is sent over each link. A time-out mechanism is used for retransmission of corrupted packets. Use of the eight-bit packet header CRC is an optimization that permits early detection of packet header errors because the header CRC is included in the full packet CRC.

As introduced above, the header 512 includes six "hint" bits 516. The hint bits 516 indicate the directions in which the packet may be routed in the three dimensions of the torus network. The hint bits are defined in XYZ order as follows: X+X−Y+Y−Z+Z−. For example, hint bits of 100100 mean that the packet can be routed in the x+ and y− directions. Either the x+ or the x− hint bits can be set, but not both, because one set bit indicated which direction to direct the packet in that dimension. The default would be for all hint bits to be unset or 0 to indicate that the packet can be sent in any direction.

In torus networks, there is typically a dimension order in which data flows between nodes. The dimension order in the examples herein is assumed to be XYZ, but other orders could also be used. The dimension order of XYZ means that data will flow from a node first in the X dimension, then through nodes in the Y dimension, then in the Z dimension. The XYZ hint bits are used in routing in the XYZ dimensions respectively.

Each node maintains a set of software-configurable registers that control the torus functions (not shown). For example, a set of registers contains the coordinates of its neighbors. Hint bits are set to 0 when a packet leaves a node in a direction such that it will arrive at its destination in that dimension, as determined by the neighbor coordinate registers. These hint bits appear early in the header so that arbitration may be efficiently pipelined. The hint bits can be initialized by either software or hardware; if done by hardware, a set of two registers per dimension is used to determine the appropriate directions. These registers can be configured to provide minimal hop routing. The routing is accomplished entirely by examining the hint bits and virtual channels; i.e., there are no routing tables. Packets may be either dynamically or deterministically dimension-ordered (xyz) routed. That is, they can follow a path of least congestion based on other traffic, or they can be routed on a fixed path. Besides point-to-point packets, a bit in the header may be set that causes a packet to be broadcast down any Cartesian dimension and deposited at each node. Software can set the hint bits appropriately so that "dead" nodes or links are avoided as described further below. Full connectivity can be maintained when there are up to three noncolinear faulty nodes.

Figure 6:
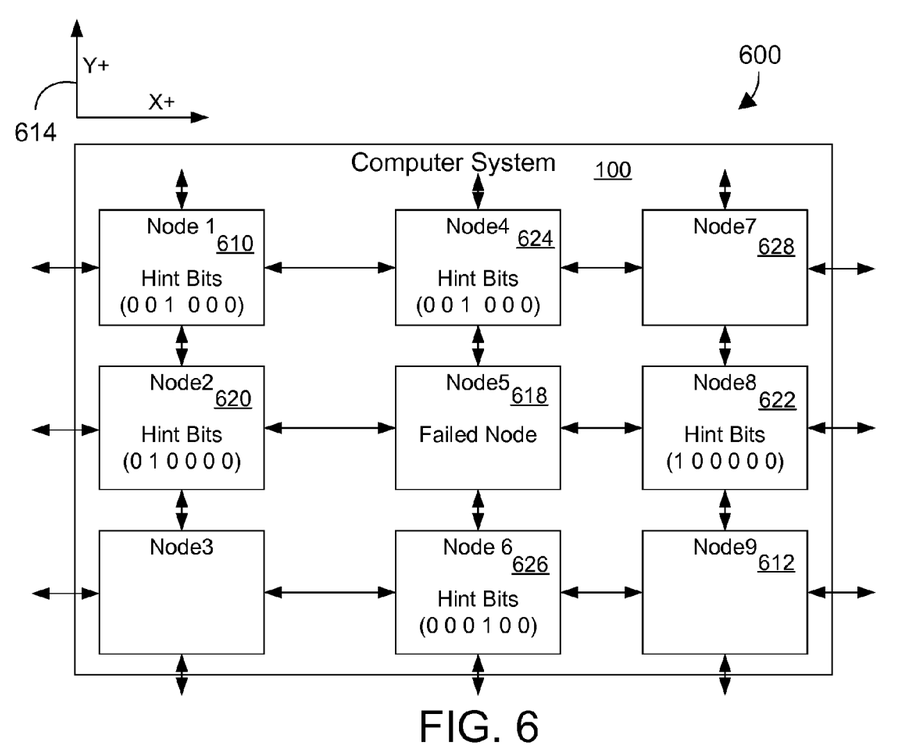
FIG. 6 is a block diagram representing a portion of a massively parallel computer system to illustrate an example.

FIG. 6 shows a block diagram that represents a portion 600 of a massively parallel computer system shown in FIG. 1 to illustrate an example dynamically rerouting node traffic. The portion 600 of the parallel computer system illustrates nine nodes labeled node1 610 through node9 612. The nodes in FIG. 6 illustrate nodes in the X and Y dimensions only to simplify the example, but it is recognized that the computer system may also have nodes located in the Z dimension. The X and Y dimensions are as indicated by the XY axis 614. For this example, we assume that an application is executing on node1 610 through node8 622. When a failure or potential failure is detected on node5 618, the application is suspended or paused and the network is quiesced by waiting until all the network traffic in the FIFOs are cleared. The application on the failed node 618 is then moved to a spare node (node9 612). Each node that may need to move data through the failed node is then updated to avoid the failed node by sending the updated problem list (144 in FIG. 1) to all or at least to the affected nodes.

Again referring to FIG. 6, the nodes use the updated problem list to insure data is routed around the affected node or network. The appropriate hint bits are then set in data packets sent from each node so that the packets will be routed around the failed node. In the example shown in FIG. 6, a data packet from node2 620 would have hint bits set for X− to direct the packet to travel in the X− direction to Node8 and thus avoid the failed node. Similarly, a data packet from node8 622 would have hint bits set for X+ to direct the packet to travel in the X+ direction to Node2. Also, a data packet from node4 624 would have hint bits set for Y+ to direct the packet to travel in the Y+ direction to Node6 and thus avoid the failed node, while a data packet from node6 626 would have hint bits set for Y− to direct the packet to travel in the Y− direction to Node4.

Figure 7:
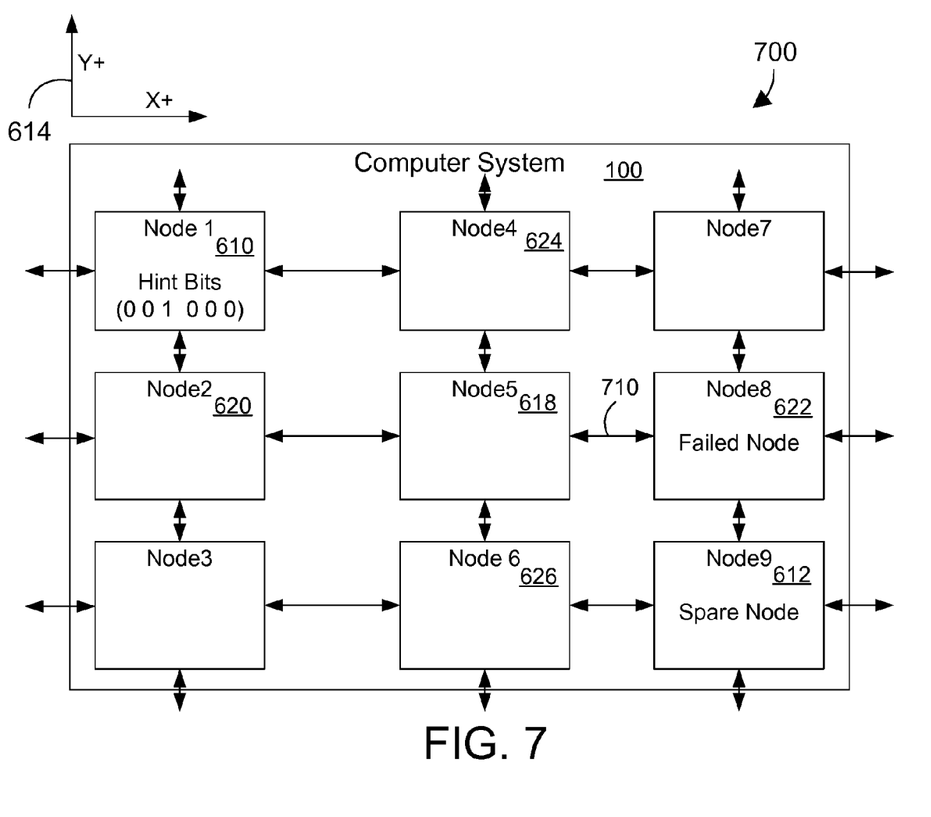
FIG. 7 is another block diagram representing a portion of a massively parallel computer system to illustrate another example.

FIG. 7 shows a block diagram that represents a portion 700 of a massively parallel computer system shown in FIG. 1 to illustrate another example for dynamically rerouting node traffic. This example illustrates how to use hint bits for non-adjacent nodes. Again, portion 700 of the parallel computer system illustrates nine nodes labeled node1 610 through node9 612 as described above for FIG. 6. In this example, a failure or potential failure is detected on node8 622. The application is paused and the network is quiesced, and the application on the failed node 618 is then moved to a spare node (node9 612). As above, each node that may need to move data through the failed node is then updated to avoid the failed node by sending the updated problem list (144 in FIG. 1) to the affected nodes. The hint bits are then set to ensure data is routed around the failed node. In the example in FIG. 7, a data packet from node1 610 would not have hint bits set for X direction since the failed node is not in this direction. But node1 610 would set the Y+ hint bit to direct the packet to travel in the Y+ direction. When the packet from node1 610 arrives at node7 628 and begins to travel in the Y dimension, it would be directed to travel to Node9 612 in the Y+ direction as indicated by the Y+ hint bit set and thus avoid the failed node8 622.

As introduced above, the hint bits can also be used to dynamically route around a congested network. As an example, we consider the network 710 between node8 622 and node5 618 illustrated in FIG. 7. If network 710 is flagged as a congested network by the network monitor (142 in FIG. 1), the hint bits are used to dynamically route around this network in the same manner as described above for routing around node8 622. Alternatively, a node may be overly burdened by cut through traffic. For example, if node8 was determined by the node/network monitor to be overloaded due to cut through traffic through node8 622, the processes on node 8 are dynamically rerouted to an available swap node to relieve the cut through traffic loading on the processes or applications that were executing on node8.

Figure 8:
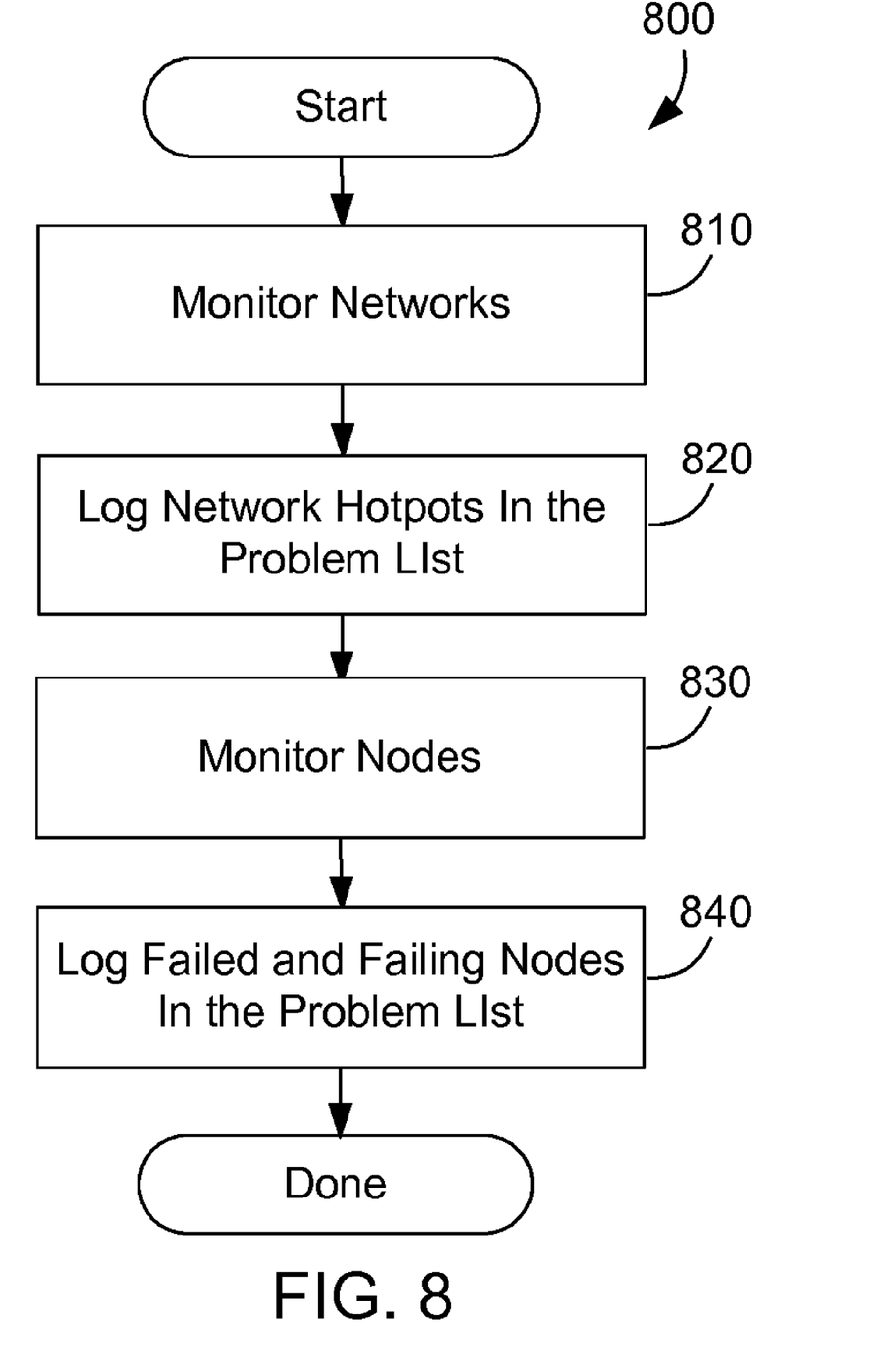
FIG. 8 is a method flow diagram for monitoring nodes and networks to create a problem list in a parallel computer system.

FIG. 8 shows a method 800 for monitoring nodes to dynamically reroute processes of failed nodes in a parallel computer system. This method is performed by software on the service node but may require software and/or hardware on the nodes to gather the required information. First, monitor the networks (step 810) and log the network hotspots in the problem list (step 820). Next, monitor the nodes (step 830) and log the failed nodes or nodes that may fail in the problem list (step 840). The method is then done.

Figure 9:
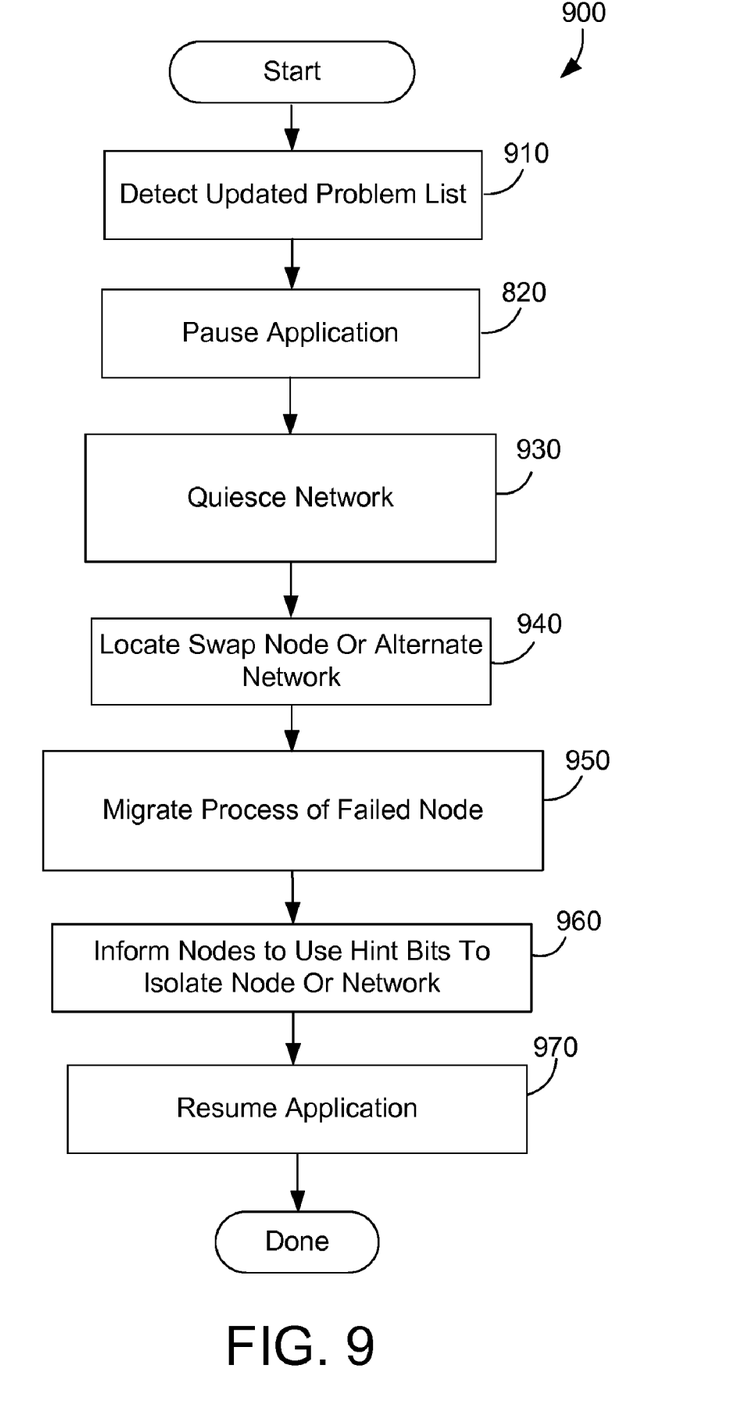
FIG. 9 is a method flow diagram for dynamically rerouting node processes using hint bits in a parallel computer system.

FIG. 9 shows a method 900 for dynamically rerouting processes of failed nodes in a parallel computer system. This method is preferably performed by software and/or hardware on each of the nodes of the parallel computer system. First, detect the updated problem list (step 910) containing nodes or networks to avoid sent by the network monitor on the service node. Next, pause the application running on the partition of the parallel system that has the failed node (step 920). Next, quiesce the network (step 930) by waiting until the torus network hardware FIFOs have finished sending their messages. Then locate a swap node or alternate path for the network (step 940) and migrate the process of the failed node to the swap node (step 950). Next, inform the nodes that would send network traffic through the failed node or network to use hint bits to isolate the node and route network traffic around the failed node or congested network (step 960). The application can then be resumed from the point where it was paused (step 970). The method is then done.

The disclosure herein includes a method and apparatus for dynamically rerouting node traffic on the compute nodes of a massively parallel computer system using hint bits without restarting applications executing on the system. Dynamically rerouting node traffic can significantly decrease the amount of down time for increased efficiency of the computer system.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

What is claimed is:

1. A parallel computer system comprising:
a plurality of nodes connected by a three dimensional torus network with network connections to six adjacent nodes in X+, X−, Y+, Y−, Z+ and Z− directions that correspond to directions of a three dimensional Cartesian array;
a node/network monitoring mechanism that monitors the nodes and network connections of the parallel computer system and creates a problem list of nodes and network connections; and
torus network hardware on a node that dynamically routes a data packet over the three dimensional torus network based on hint bits, wherein the hint bits are a plurality of binary values in the data packet with a binary value for each network direction from the node, namely the X+, X−, Y+, Y−, Z+ and Z− directions;
wherein a set hint bit indicates to the torus network hardware a direction to direct the data packet on the three dimensional torus network to avoid the nodes and network connections in the problem list.

2. The parallel computer system of claim 1 wherein the hint bits are included in a header of the data packed sent over the three dimensional torus network.

3. The parallel computer system of claim 2 wherein the node dynamically routes the data packet using the hint bits by pausing an application that is executing on the node and using the torus network to update the problem list and then the application is resumed from the point it was paused.

4. A computer implemented method for dynamically rerouting node processes on compute nodes connected by a three dimensional torus network in a parallel computer system using hint bits without restarting applications executing on the system, where the method comprises the steps of:

(A) monitoring the nodes and the three dimensional torus network for problems and identifying problem nodes and problem network connections in a problem list, wherein the three dimensional torus network has network connections to six adjacent nodes in X+, X−, Y+, Y−, Z+ and Z− directions that correspond to directions of a three dimensional Cartesian array;

(B) detecting when the problem list is updated;

(C) pausing execution of nodes executing an application that is using the torus network;

(D) setting at least one of the hint bits to isolate a node or network connection in the problem list, wherein the hint bits are a plurality of binary values in a data packet with a value for each network direction from the node, namely the X+, X−, Y+, Y−, Z+ and Z−directions, and the hint bits indicate a direction to direct the data packet over the network connections to avoid the nodes and network connections in the problem list; and (E) notifying all nodes paused in step (C) to resume execution.

5. The computer implemented method of claim 4 wherein the hint bits are included in a header of the data packed sent over the one or more networks.

6. The computer implemented method of claim 4 further comprising the step of:
   migrating the process of at least one failed nodes to at least one backup node.

7. The computer implemented method of claim 4 wherein step (B) comprises detecting a congested network to a node and step (D) comprises setting at least one hint bit to route traffic around the congested node.

8. A computer-readable program product for execution on a parallel computer system with a plurality of nodes connected by a three dimensional torus network with network connections to six adjacent nodes in X+, X−, Y+, Y−, Z+ and Z− directions that correspond to directions of a three dimensional Cartesian array comprising:
   a node/network monitoring mechanism that monitors the nodes and network connections of the parallel computer system and creates a problem list of nodes and network connections; and
   a node routing mechanism that dynamically routes a data packet over the three dimensional torus network using hint bits wherein the hint bits are a plurality of values in a data packet with a binary value for each network direction from the node, namely the X+, X−, Y+, Y−, Z+ and Z− directions that when set indicates to the node routing mechanism a direction to direct the data packet over the three dimensional torus network to avoid the nodes and network connections in the problem list; and
   computer storage media having computer program instructions operable for causing a computer to execute the node/network monitoring mechanism and the node routing mechanism.

9. The program product of claim 8 wherein the hint bits are included in a header of the data packed sent over the three dimensional torus network.

10. The program product of claim 9 wherein the node dynamically routes the data packet using hint bits by pausing the application that is executing on the node and using the torus network to update the problem list and then the application is resumed from the point it was paused.

* * * * *